US008104672B2

(12) United States Patent
Mitchell, Jr. et al.

(10) Patent No.: US 8,104,672 B2
(45) Date of Patent: Jan. 31, 2012

(54) SECURITY SYSTEM, MOBILE SECURITY DEVICE, AND METHODS OF OPERATING

(75) Inventors: Robert James Mitchell, Jr., Waterford, NY (US); Bruce Gordon Barnett, Troy, NY (US); Ewa Margaret Pigna, Boynton Beach, FL (US); Kerry Bonin, Salem, OR (US); Michael James Hartman, Clifton Park, NY (US); John Erik Hershey, Ballston Lake, NY (US); Russell Miles, St. Petersburg, FL (US); Timothy McClure, Lake Worth, FL (US); Marcin Kolasinski, Gdansk (PL)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 213 days.

(21) Appl. No.: 12/560,671

(22) Filed: Sep. 16, 2009

(65) Prior Publication Data

US 2011/0062226 A1 Mar. 17, 2011

(51) Int. Cl.
*G06F 17/00* (2006.01)

(52) U.S. Cl. .................... 235/375; 235/472.01; 235/487

(58) Field of Classification Search .................. 235/375, 235/462.05, 376, 462.01, 487, 472.01, 382
See application file for complete search history.

(56) References Cited

U.S. PATENT DOCUMENTS

| | | | | |
|---|---|---|---|---|
| 5,572,192 | A | 11/1996 | Berube | |
| 6,046,689 | A | 4/2000 | Newman | |
| 6,091,956 | A * | 7/2000 | Hollenberg | 455/456.5 |
| 6,636,803 | B1 | 10/2003 | Hartz, Jr. et al. | |
| 7,202,773 | B1 * | 4/2007 | Oba et al. | 340/5.8 |
| 7,209,035 | B2 * | 4/2007 | Tabankin et al. | 340/539.11 |
| 7,289,023 | B2 | 10/2007 | Schneider et al. | |
| 7,345,577 | B2 | 3/2008 | O'Flaherty et al. | |
| 7,658,327 | B2 * | 2/2010 | Tuchman et al. | 235/381 |
| 7,802,724 | B1 * | 9/2010 | Nohr | 235/384 |
| 2003/0206100 | A1 * | 11/2003 | Richman et al. | 340/506 |
| 2005/0035863 | A1 | 2/2005 | Nelson | |
| 2006/0059557 | A1 | 3/2006 | Markham et al. | |
| 2006/0181411 | A1 * | 8/2006 | Fast et al. | 340/539.13 |
| 2010/0170947 | A1 * | 7/2010 | Christofferson | 235/382 |

FOREIGN PATENT DOCUMENTS

| | | | |
|---|---|---|---|
| EP | 1762964 | A1 | 3/2003 |
| WO | 2005119539 | A1 | 12/2005 |

* cited by examiner

*Primary Examiner* — Edwyn Labaze
(74) *Attorney, Agent, or Firm* — Kinney & Lange, P.A.

(57) ABSTRACT

System, device and methods that provide proximate environmental and security intelligence to a guard making a security tour or round in an installation, as well as that provide for certifying that the guard has visited designated and known checkpoints on or about the times at which the guard is expected at those checkpoints.

21 Claims, 7 Drawing Sheets

SECURITY SYSTEM, MOBILE SECURITY DEVICE, AND METHODS OF OPERATING

CROSS-REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The field of the invention relates to security systems generally, and more particularly to certain new and useful advances in guard communications of which the following is a specification, reference being had to the drawings accompanying and forming a part of the same.

2. Description of Related Art

A mobile guard's awareness is often limited to what may be seen or heard while on a tour through an installation. For example, an emergency situation, such as a fire or an intruder on the other side of a wall, may not be discoverable while the guard is away from a central security console that has displays and sensor presentations. There is therefore a need for a way for a mobile guard to be made aware of visually and audibly blocked surroundings while on tour.

it is also desirable that there be a way to check that the guard did indeed visit appointed locations during certain time windows. There is therefore also a need for a way to verify that the mobile guard has properly completed appointed rounds.

BRIEF SUMMARY OF THE INVENTION

Various embodiments of a method and system are disclosed that provide proximate environmental and security intelligence to a guard making a security tour or round in an installation. Also disclosed are various embodiments that include a provision for certifying that the guard has visited designated and known checkpoints on or about the times at which the guard is expected at those checkpoints and the provision of sensors and a channel from the guard back to a security station for reporting observed data.

Other features and advantages of the disclosure will become apparent by reference to the following description taken in connection with the accompanying drawings.

BRIEF DESCRIPTION OF THE SEVERAL VIEWS OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

Figure 1:
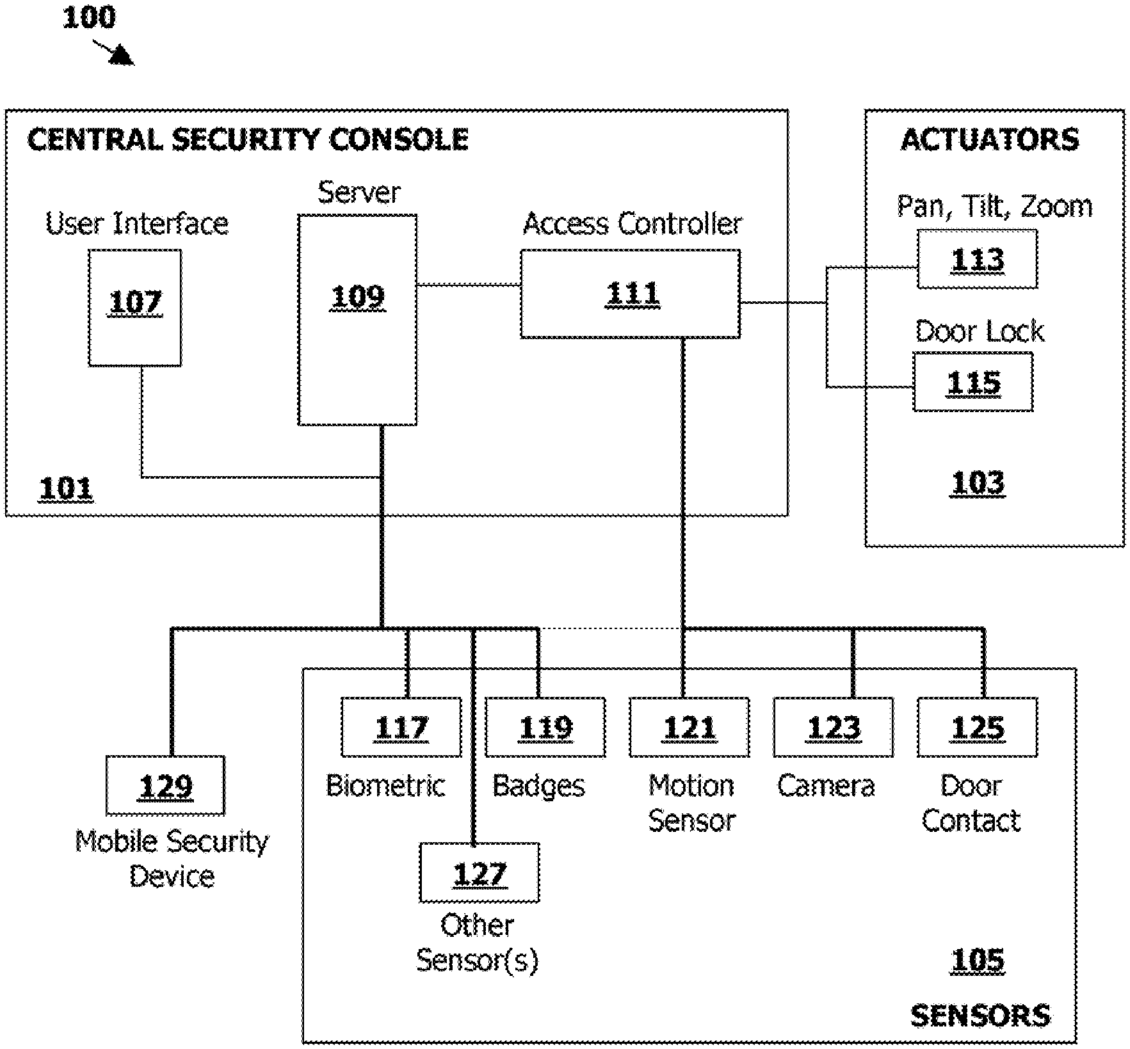
FIG. 1 is a diagram that illustrates an embodiment of a physical security system.

In the exemplary embodiment, a security guard performing mobile rounds of an installation will carry a Mobile Security Device ("MSD") that provides at least two functions: display of sensors about a guard's location together with data from those sensors, and certification, or evidence, that a guard visited one or more checkpoints.

First Function—Display of Sensors Surrounding a Guard's Location

The first function provides a display of sensors monitoring spaces proximate the guard's position as he or she progresses through a particular area. The sensors that are displayed on the guard's MSD may be fixed installation sensors that are linked with an installation's physical security system. The MSD may receive sensor data sent wirelessly from the central security console, or may query installation sensors directly when allowed by policy.

Features of the first function comprise, by way of example and not limitation:

(a) a visual display of one or more sensors in a proximate area ("spatial extent") surrounding the guard's present position, and optionally—a visual and/or audible indication of sensor data for the one or more of the sensors;

(b) a visual display of one or more sensors in an area proximate the guard's scheduled route, and optionally—a visual and/or audible indication of sensor data for the one or more sensors; or (c) a visual display of one or more sensors in an area proximate a path extrapolated from the guard's most recent direction of movement, and optionally—a visual and/or audible indication of sensor data for the one or more of the sensors.

The sensor data for which the MSD provides a visual and/or audible indication can comprise, but is not limited, to an alarm, such as a fire alarm, a smoke alarm, a door alarm, and so forth.

At least the sensor data for the display is sent to the MSD via a wireless transmission from a central security console that has access to the data from the one or more sensors that are proximate to the guard's present position, scheduled route, or the path extrapolated from the guard's most recent direction of movement. Map data for the display is also sent to the MSD via wireless transmission from the central security console or other network server. Alternatively, the map data for the display can be preloaded into a memory of the MSD.

In one embodiment, the map and/or sensor data is processed at the central security console and formatted so that its spatial extent is appropriate for the guard's position at the time of the guard's receiving the map and/or sensor data. The spatial extent may also be adjustable by either the guard or an operator of the central security console.

The spatial extent on the MSD display may be oriented with respect to the guard's most recent direction of motion or most recent orientation to provide a more natural and instantaneously unambiguous spatial reference to a mobile guard.

Second Function—Certification, or Evidence, of Checkpoints Visited

The second function provided by the MSD provides certification or evidence that the guard did indeed visit specified checkpoints, known to the guard, on or about time targets also known to the guard, during completion of the guard's appointed patrol.

In the exemplary embodiment, the evidence is provided by a scanning and recordation—or processed recordation—of an output of a fixed security device ("FSD") at each checkpoint to be visited during a patrol. The FSD is anchored to structure near its location and is resistant to penetration and unauthorized opening. The FSD output comprises one or more informational elements, which comprise, but are not limited to:

a fixed security station identifier;

a time code; and a certification informational element such as a symbol string.

The symbol string may change in a pseudorandom manner with a time code. An algorithm producing the value of the certification informational element may be a cryptographic process with a keying variable involving the security station identifier.

The FSD output may be electronic and communicated to the MSD by a near field communication ("NFC") transmission. Other modes of communication between the FSD and the MSD may include acoustic, seismic (or vibration), optical (such as infrared, visible light, or ultra-violet), magnetic, and direct or capacitive electrical contact.

The central security console may determine the guard's present position, most recent direction of movement, and/or most recent orientation in at least two ways:

(a) the MSD contains onboard accelerometers, position sensors, and the like that output the MSD's location, most recent direction of movement, and/or most recent orientation for wireless transmission to the central security console; or (b) alternatively, the MSD wirelessly transmits its present position, most recent direction of movement, and/or most recent orientation to the central security console. This may be accomplished using, by way of example and not limitation: accelerometers, radio or audio-based location techniques, and/or by calculation based on sensor imagery provided to the central security console whose processed outputs are formatted and/or overlaid with map data and/or sensor data, and then wirelessly sent from the central security console to the MSD for display.

Physical Security System

FIG. 1 is a diagram that illustrates an embodiment of a physical security system ("system") 100. At a high-level components of system 100 comprise a central security console 101, which is coupled with one or more actuators 103, with one or more sensors 105, and with a mobile security device ("MSD") 129. The central security console 101 is wirelessly coupled with the MSD 129, and may be wired to or wirelessly coupled with the one or more sensors 105.

Each of the high-level components comprises one or more sub-components. For example, the central security console comprises a user interface 107, a server 109, and an access controller 111. The user interface 107, which may be a keypad, a display and/or a computer mouse, is coupled with a server 109 and with one or more of the sensors 105. The one or more actuators 103 comprise a pan, tilt, and zoom actuator for a security camera and one or more door locks 115. The one or more sensors 105 comprise biometric identification device(s) 117, employee badge reader(s) 119, motion sensor(s) 121, security camera(s) 123, door contacts 125, and (optionally) one or more other sensors 127. The one or more other sensors 127 may include, without limitation: fire sensors, smoke detectors, microphones, keypads, and so forth.

The access controller 111 is coupled with the one or more actuators 103 and with the one or more sensors 105. In particular, the access controller 111 is coupled with the pan, tilt, and zoom motors 113 of a camera, and with one or more door locks 115. The access controller 111 is also coupled with, and configured to control, sensors 105 such as: motion sensor(s) 121, security camera(s) 123, and/or door contact(s) 125. Optionally, the access controller 111 may be coupled with, and configured to control, the biometric identification device(s) 117, the employee badge reader(s) 119, and/or the one or more other sensors 127.

Sensor data output from each of the sensors 105 is sent to the central security console 101 and stored in a database on the server 109 for later retrieval, processing, and/or transmission. Additionally or alternatively, each sensor stores sensor data in its memory, for later transmission to the database on the server 109 or for direct retrieval by the MSD 129. Examples of the sensor data output from each of the sensors 105 comprises, but is not limited to: when an event occurred, the type of event detected, and the sensor that made the detection. Simple sensors, such as the door contact(s) 125 or a fire/smoke detector may output limited data, such as that a door is open/closed or that fire/smoke has been detected. More complex sensors, such as the biometric identification device(s) 117 and/or the security camera(s) 123 may output more robust data that can be processed using known techniques to identify one or more persons (with a given probability) and/or to predict a probable individual and/or group behavior.

Mobile Security Device ("MSD")

Figure 2:
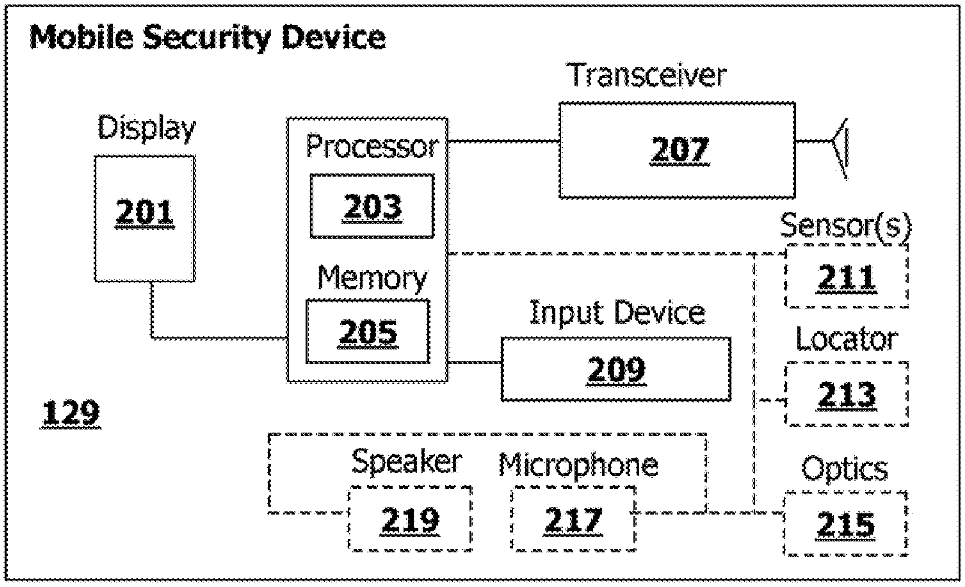
FIG. 2 is a diagram of an embodiment of a mobile security device ("MSD")

FIG. 2 is a diagram of an embodiment of the mobile security device ("MSD") 129, shown in FIG. 1. Sub-components of the MSD 129 comprise, without limitation: a display 201, which is coupled with a suitable computer processor ("processor") 203 and configured to display map data together with sensor location data and/or sensor data that corresponds to one or more installation sensors 105 (in FIG. 1) in an area proximate a guard's location, most recent direction of movement, and/or most recent orientation. The display 201 may be a liquid crystal display ("LCD"), a light emitting diode ("LED") display, an organic light emitting diode ("OLED") display, a plasma display, or any other type of display technology that is suitable for handheld computing applications.

The processor 203 is coupled with a memory 205 and configured to process the map data, sensor location data and/ or sensor data for display on the display 201. The processor 203 is further configured to operate the transceiver 207 to send and receive encrypted wireless messages to and from the server 109 (FIG. 1) of a central security station 101 (FIG. 1)—or to and/or from the one or more sensors 105 (FIG. 1). The processor 203 is further configured to receive and process inputs from an input device 209, such as a keypad, a computer mouse, a touch screen, and so forth.

Optionally, the processor 203 may be configured to operate and/or process data received from one or more onboard sensors 211, a locator 213, optics 215, a microphone 217 and/or a speaker 219. Examples of the one or more onboard sensors 211 comprise, without limitation: a temperature sensor, a gas sensor, a temperature gradient sensor, a humidity sensor, and so forth. For outdoor patrols of an installation, the locator 213 may be a global positioning system ("GPS") receiver. For indoor patrols of an installation, the locator 213 is any device, or combination of devices, that outputs data, which the processor 203 and/or the server 109 (FIG. 1) can process to calculate the MSD's location, most recent direction of movement and/or most recent orientation. In one embodiment, the locator 213 comprises an accelerometer. In this embodiment, the processor 203 processes the accelerometer outputs together with triangulation data received in or from wireless signals outputted by different, geographically separate sources and received by the transceiver 207 to calculate one or more of the MSD's location, most recent direction of motion and/or most recent orientation. The optional optics 215 may comprise one or more of: a still camera, a video camera, a barcode scanner, and/or a barcode reader. The optional microphone 217 is configured to receive voice commands from a user of the MSD 129, to receive and route voice data to the processor 203 for processing and/or wireless transmission, via the transceiver 207, to the server 109 (FIG. 1) of the central security console 101 (FIG. 1), and/or to record ambient sounds during a guard's patrol. The optional speaker 219 is configured to play audible indications of sensor data (such as an indication of a fire alarm, smoke alarm, detection of a hazardous gas, etc.) and/or may be further configured to play voice data received from the central security console 101 (FIG. 1).

Examples of Operation

Figure 3:
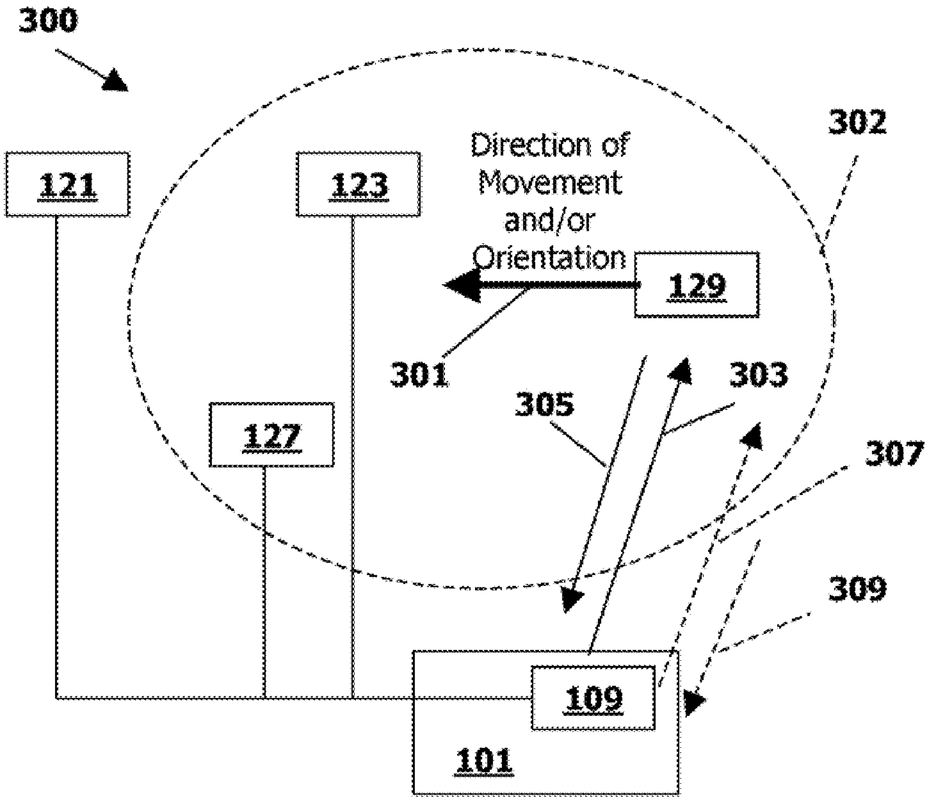
FIG. 3 is a diagram illustrating an embodiment of the physical security system of FIG. 1 in which sensor location and/or sensor data is transmitted to the MSD together with orientation data.

FIG. 3 is a diagram 300 illustrating an embodiment of the physical security system of FIG. 1 in which sensor location and/or sensor data is transmitted to the MSD 129 together with orientation data. The central security console 101, comprising server 109, is coupled with a motion sensor 121, a security camera 123, and one or more other sensors 127 (such as a fire detector and/or a smoke detector). Transported by a guard (not shown), the MSD 129 has a direction of movement and/or an orientation, which is represented by arrow 301, which points from the MSD 129 toward the sensors 121, 123 and 127. Surrounding the MSD 129 and overlapping at least the sensors 123 and 127 is a spatial extent 302. As used herein, the term "spatial extent" refers to the area proximate a guard's location, most recent direction of move ent, and/or most recent orientation.

The server 109 sends wireless messages 303 and/or 307 to the MSD 129, and receives wireless messages 305 and/or 309 from the MSD 129, over an encrypted wireless channel. In operation, the server 109 receives one or more first wireless messages 305 from the MSD 129, which comprise data indicative of, or which can be processed by the server 109 to calculate, the MSD's location, most recent direction of motion and/or most recent orientation. Thereafter, the server 109 transmits one or more second wireless messages 303 to the MSD 129, which comprise one or more of: map data, sensor location data, sensor data and/or orientation data. The sensor location data and/or sensor data is/are provided at least for the sensors 123 and 127 that are within, or overlapped by, the spatial extent 302. In order to transmit the one or more second wireless messages 303, the server 109 may compare at least the MSD location data and/or the MSD most recent direction of motion data with one or more previously stored lookup tables that contain sensor location data. The MSD processor 203 (FIG. 2) processes the orientation data, which may be provided by the server 109 and/or the MSD 129, and outputs display data that orients and/or overlaps the map data, sensor location data and/or sensor data on the MSD display 201 (FIG. 2).

In an alternative embodiment, the server 109 calculates and transmits to the MSD 129, in one or more third wireless messages 307, one or more of MSD location data, MSD most recent direction of motion data, MSD most recent orientation data and sensor location data. Thereafter, the MSD processor 203 (FIG. 2) processes this data to output display data that orients and/or overlaps the map data and/or sensor location data on the MSD display 201 (FIG. 2). Thereafter, the processor 203 (FIG. 2) receives inputs from a user of the MSD 129 that select one or more of the displayed sensor locations. This inputted data is then processed and transmitted, via the MSD transceiver 107 (FIG. 2) to the server 109 in one or more fourth wireless messages 309. Thereafter, the server 109 retrieves and transmits sensor data back to the MSD 129 for the selected sensor locations.

Figure 4:
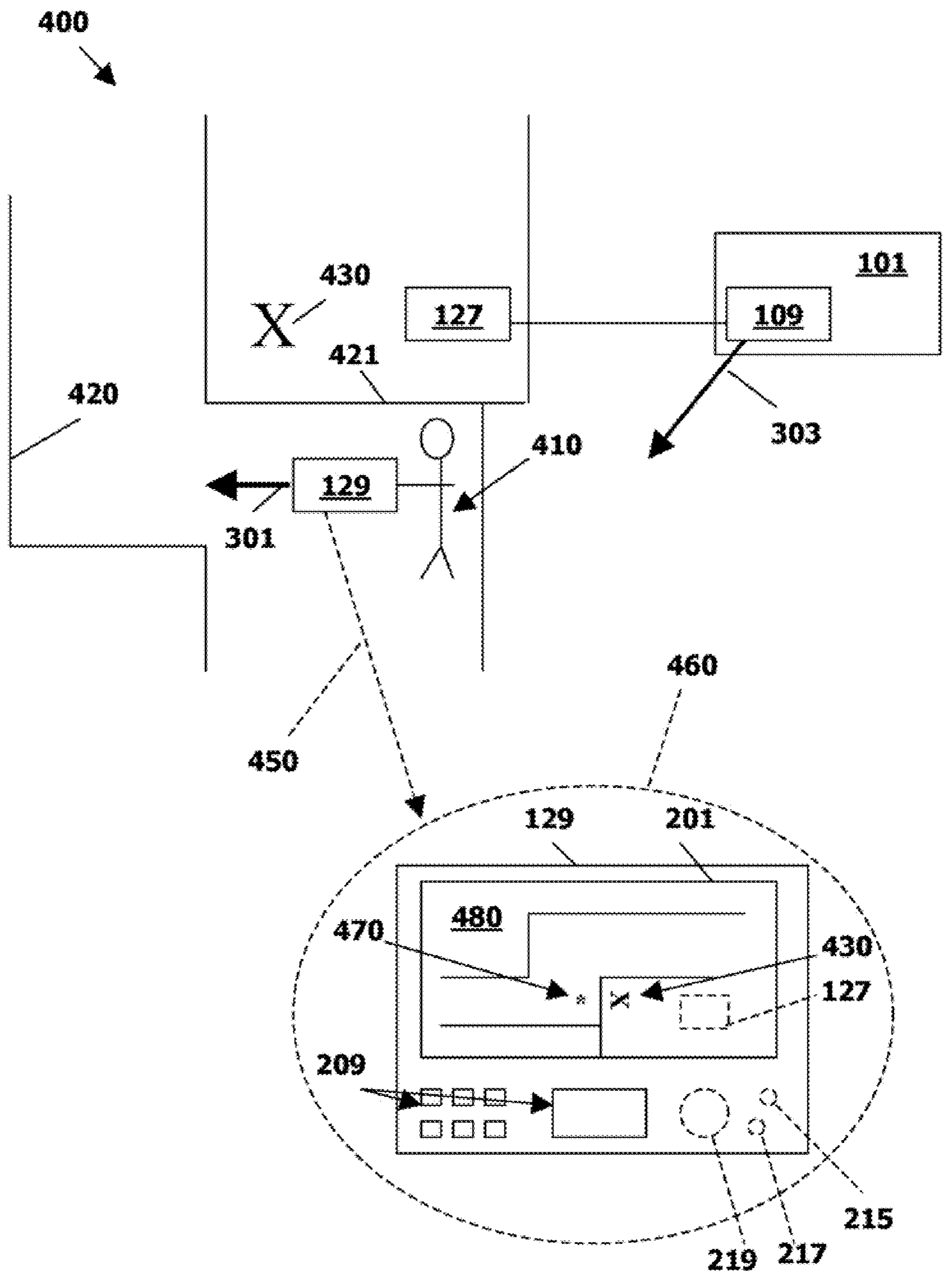
FIG. 4 is a diagram illustrating how an event detected by a sensor is displayed on the MSD for viewing by a user of the MSD.

FIG. 4 is a diagram 400 illustrating how an event 430 detected by a sensor 127 is displayed on the MSD 129 for viewing by a user 410 of the MSD 129. The user 410 is depicted, in this non-limiting example, as walking toward a wall 420. In a space on the user's right but hidden by an adjacent wall 421 is the event 430—which for purposes of illustration only, may be a fire. A central security console 101 knows of the event 430 by one or more sensors 127. The central security console 101 also knows the MSD's location, most recent direction of motion and/or or most recent orientation and, as previously described, sends map data of the proximate area to the MSD 129, together with sensor location data, sensor data and/or orientation data. As a result, the MSD's visual display is oriented with respect to at least one of the MSD's location, most recent direction of movement and/or most recent orientation. Arrow 450 points from the MSD 129 to a view 460 of what the user 410 sees.

The view 460 depicts a sample front view of an exemplary MSD 129, which comprises, by way of example and not limitation, the display 201, input devices 209 (keypad and computer mouse), and optional camera 215, microphone 217 and speaker 219. On the display 201 is shown a map 480 of the area proximate the guard's/MSD's location, oriented to the MSD's most recent direction of motion and/or the MSD's most recent orientation, as represented by arrow 301. The map 480 depicts the MSD's location 470 relative to a location of the detected event 430. Optionally the display 201 depicts a location, and/or identification of an installation sensor 127

Methods

Figure 5:
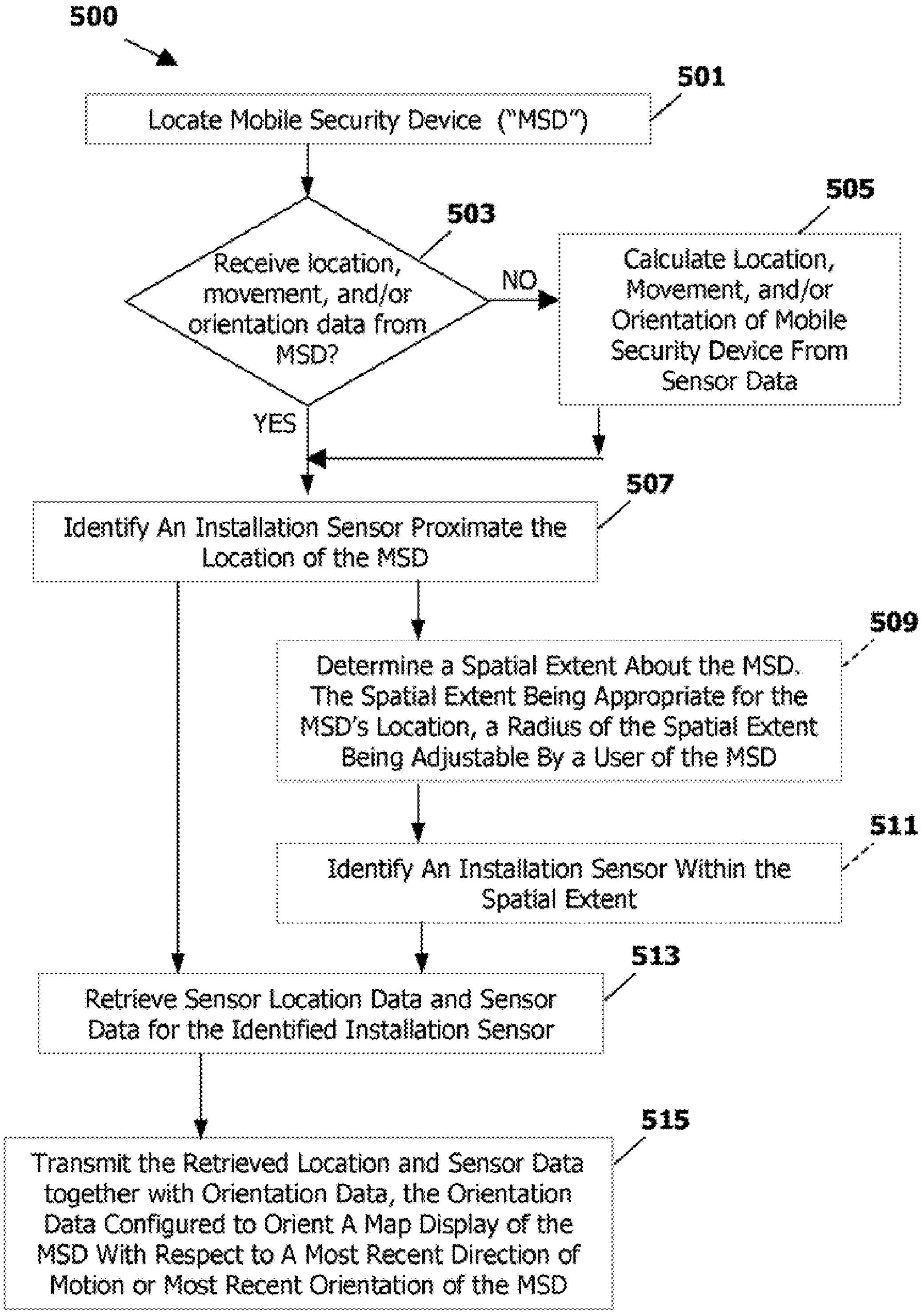
FIG. 5 is a flowchart illustrating an embodiment of a method for communicating with the MSD.

FIG. 5 is a flowchart illustrating an embodiment of a method 500 for communicating with the MSD 129 (FIGS. 1, 2, 3, and 4). Referring to FIGS. 1, 2, 3, 4, and 5, the method 500 begins by locating 501 the MSD 129. At decision block 503, the server 109 determines whether location, most recent direction of movement and/or most recent orientation data has been received from the MSD 129 if no, the server 109 calculates 505 the MSD's location, most recent direction of movement, and/or most recent orientation from sensor data provided at least by the one or more sensors 105. If yes, the server 109 identities 507 an installation sensor proximate the location of the MSD 129. Optionally, the identification step 507 may comprise determining 509 a spatial extent 302 about the MSD 129. The size of the spatial extent 302 varies, but is selected as being appropriate for the MSD's location. In one embodiment, the spatial extent 302 has a radius that is configurable and adjustable by a user 410 of the MSD 129. Optionally, the identification step 507 may further comprise identifying one or more installation sensors within, or overlapped, by the spatial extent 511. Proceeding from either step 507 or 511, the method 500 may further comprise retrieving 513 at least sensor location data and/or sensor data for the identified installation sensor. Thereafter, the server 109 may transmit 515 the retrieved sensor location data and/or the retrieved sensor data, together with orientation data, which is data configured to orient a map display of the MSD with respect to the MSD's location, most recent direction of movement and/or most recent orientation.

Figure 6:
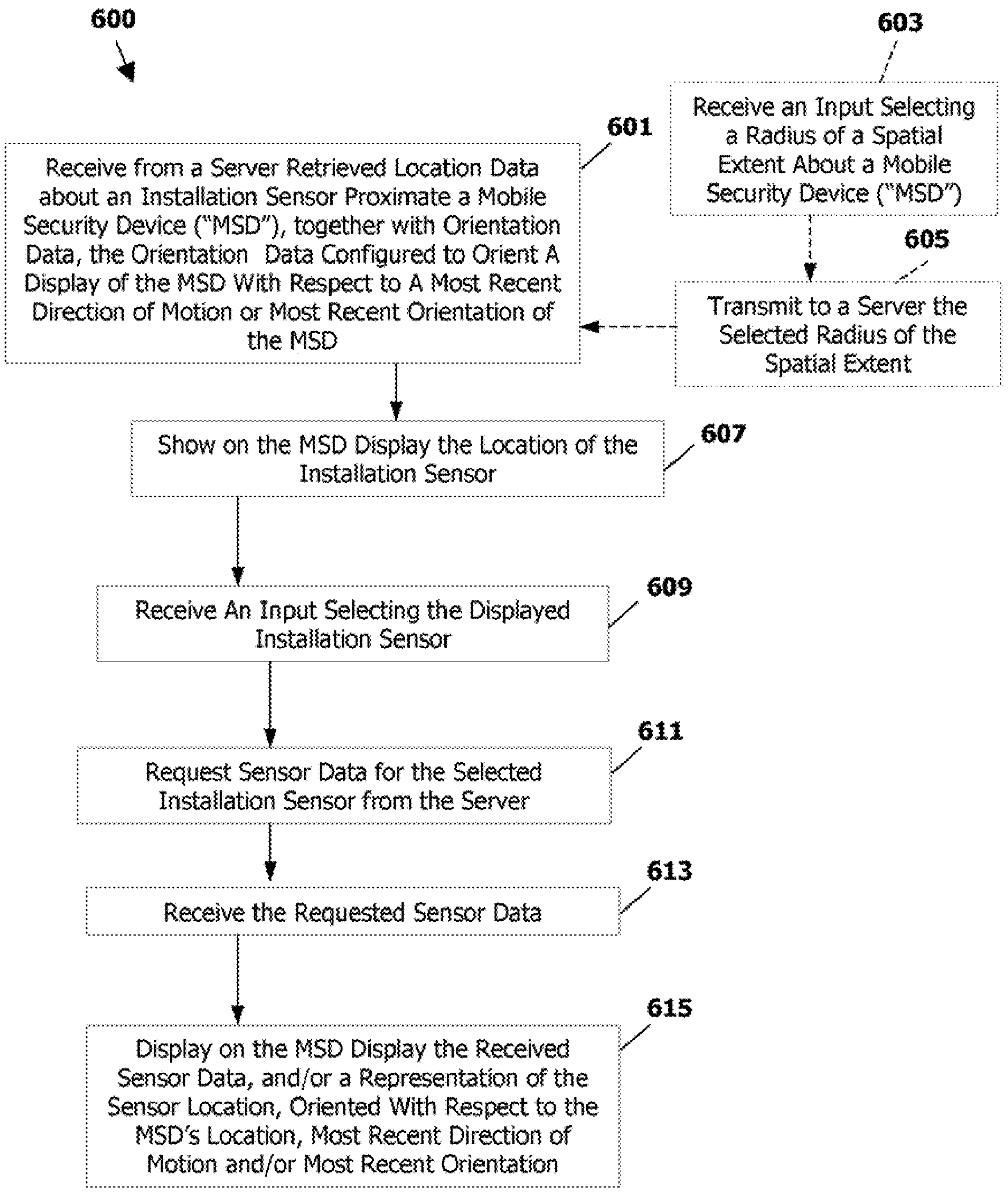
FIG. 6 is a flowchart illustrating an embodiment of a method for communicating with a physical security system sensor via a fixed security console.

FIG. 6 is a flowchart illustrating an embodiment of a method 600 for communicating with a physical security system sensor 105 (FIG. 1) via a fixed security console 101 (FIGS. 1, 3, 4). Referring to FIGS. 1, 2, 3, 4 and 6, one embodiment of the method 600 begins by the MSD 129 receiving 601 from the server 109 retrieved location data about an installation sensor 105 proximate the MSD, together with the orientation data described above. Alternatively, the method 600 begins by the MSD 129 receiving 603 an input that selects a radius of a spatial extent 302 about the MSD 129. Thereafter, the method 600 optionally timber comprises the MSD 129 transmitting 605 the selected radius of the spatial extent 302 to the server 109.

Proceeding from step 601, the method 600) may further comprise showing 607 on the MSD display 201 an indication of the location of the installation sensor 105, 127. Thereafter, the MSD 129 may receive 609 an input that selects the displayed installation sensor 105, 127. Upon receiving 609 this input, the MSD requests 611 sensor data for the selected installation sensor 105, 127 from the server 109 of the central security console 101. Thereafter, the MSD 129 receives 613 the requested sensor data, and may display 615 the received sensor data on the MSD display 201, together with a representation of the sensor's location—oriented with respect to the MSD's location, most recent direction of motion and/or most recent orientation.

Figure 7:
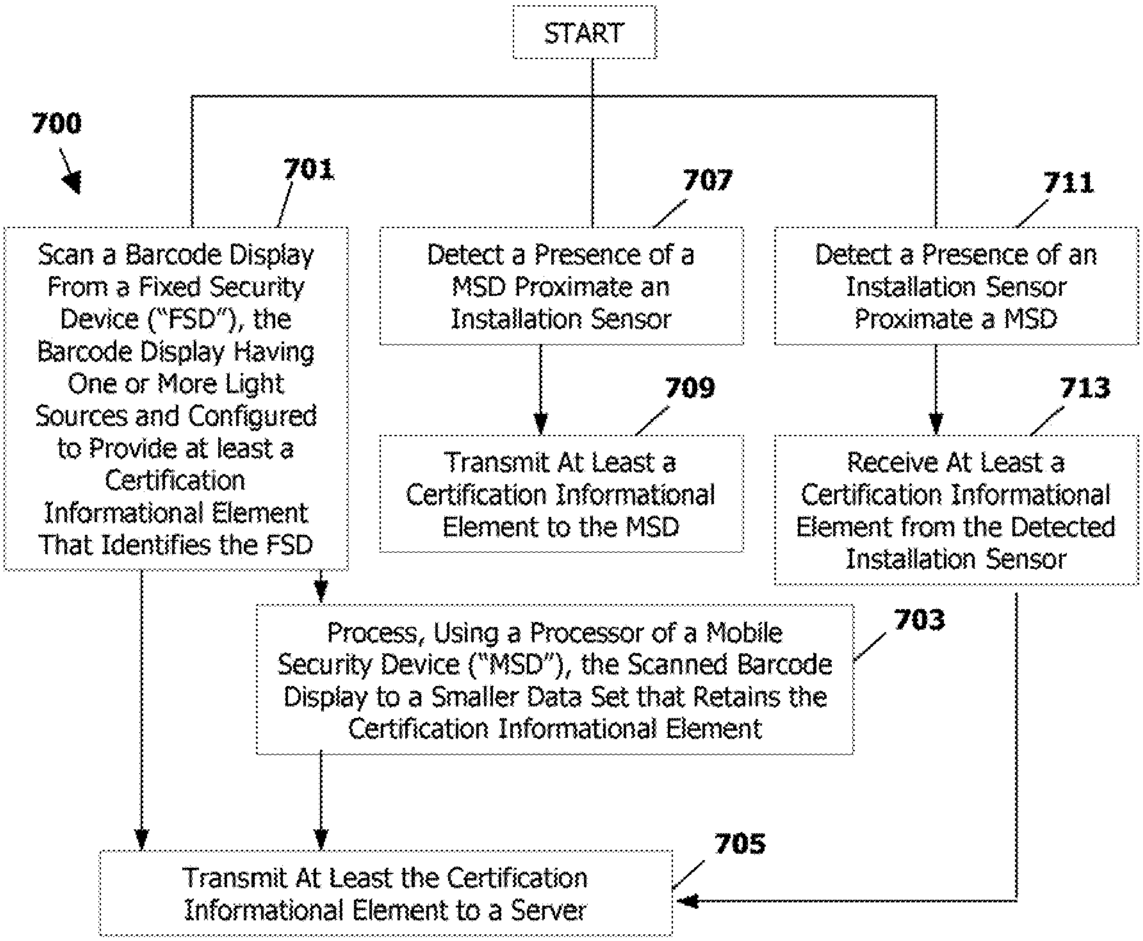
FIG. 7 is a flowchart illustrating an embodiment of a method for using the MSD to report and/or confirm that a security check has been completed.
Figure 8:
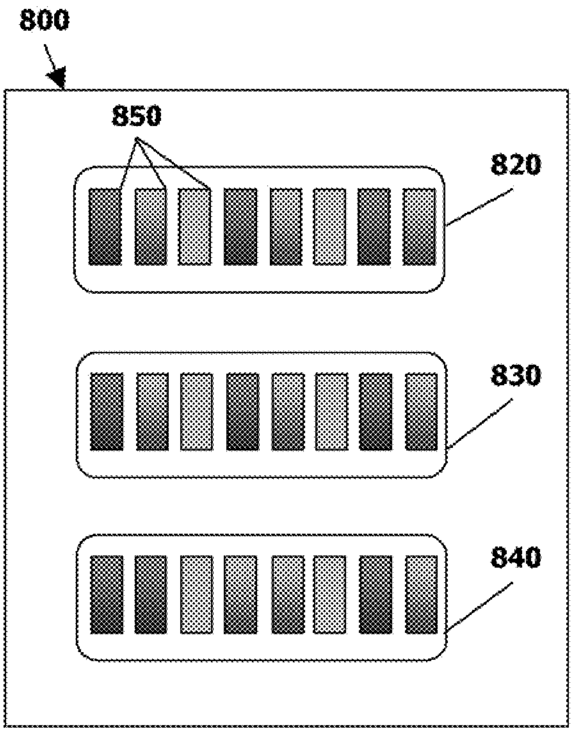
FIG. 8 illustrates a fixed security device having a barcode display comprised of one or more light sources, such as Light Emitting Diodes ("LEDs")

FIG. 7 is a flowchart illustrating an embodiment of a method 700) for using the MSD 129 (FIGS. 1, 2, 3, 4) to report and/or confirm that a security check has been completed. FIG. 8 illustrates a fixed security device ("FSD") 800 having one or more barcode displays 820, 830 and 840. Each barcode display 820, 830 and 840 comprises one or more light sources 850, such as—but not limited to—Light Emitting Diodes ("LEDs"). Each barcode display 820, 830 and 840 is configured to provide a certification informational element (not shown) that identifies the FSD.

Referring to FIGS. 1, 2, 3, 4, 7 and 8, the method 700 starts at any of steps 701, 707 or 711. At step 701, the MSD 129 scans a barcode display 820, 830 and/or 840 from a fixed security device 800. From step 701, the method 700 may proceed to step 703 or directly to step 705. Step 703 comprises processing, using a processor 203 of the MSD 129, the scanned barcode display 820, 830 and/or 840 to a smaller data set that retains the certification informational element. Step 705 comprises transmitting, using the transceiver 207 of the MSD 129, at least the certification informational element, to the server 109 of the central security station 101

Alternatively, the method 700 begins by a sensor 105 detecting 707 a presence of the MSD proximate an installation sensor 105. From step 707, the method comprises the sensor 105 transmitting 709 at least a certification informational element to the MSD 129

Alternatively, the method 700 begins by a MSD 129 detecting 711 a presence of an installation sensor 105 proximate the MSD 129. From step 711, the method 700 comprises the MSD 129 receiving 713 a certification informational element from the detected installation sensor 105. From step 713, the method proceeds to previously described step 705.

Computer System

Referring again to FIGS. 1, 2, 3, 4, 5, 6, 7 and 8, the functions or algorithms of the physical security system 100, and components and subcomponents thereof, may be implemented in software or a combination of software and user-implemented procedures, and executed by machines comprising computer hardware and/or firmware. The software may comprise computer-executable instructions stored on computer readable media, and/or in computer-readable memory. "Computer readable media" comprises disks as well as carrier waves, which are any type of electromagnetic wave that can be modulated, either in frequency, amplitude or phase, to transmit the computer-executable instructions. The functions of MSD 129, the FSD 800 and/or other components of the physical security system 100 may be represented by one or more software modules. This software and/or its modules can be executed at least by the server 109 and/or the MSD processor 203.

Various steps of the methods described herein may be performed serially, or in parallel, using multiple processors or a single processor configured as two or more virtual machines or sub-processors.

Figure 9:
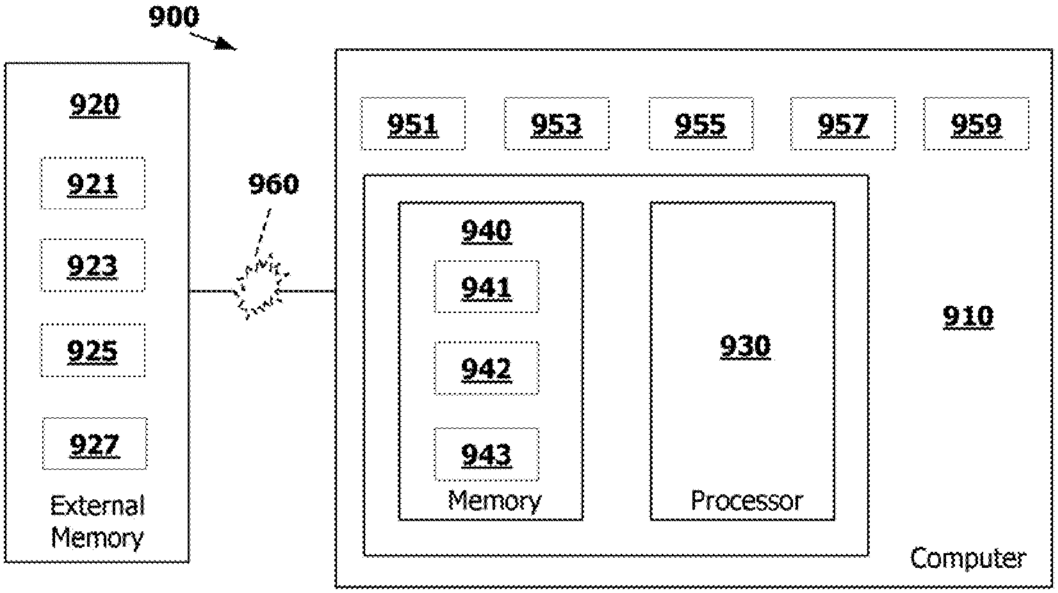
FIG. 9 is a block diagram of a computer system that may be used to implement software used by embodiments of the physical security system and/or the MSD.

FIG. 9 is a block diagram of a computer system 900 that may be used to implement software used by embodiments of the physical security system 100 (FIG. 1) and/or the MSD 129 (FIGS. 1, 2, 3 and 4). The computer system 900 comprises a computer 910, and may optionally comprise external, or network, devices 920. The computer 910 comprises a processor 903 coupled with a memory 940, which may comprise a volatile memory 941 and/or a non-volatile memory 942. A computer software program 943 may be stored in the memory 940 for execution by the processor 930. The computer 910 may further comprise a removable storage device 951 and/or a non-removable storage device 953. Via a wireless or wired communication channel, the computer 910 may have access to external volatile memory 921, external non-volatile memory 923, external removable storage device(s) 925, and/or external non-removable storage device(s) 927. Collectively, the internal storage devices 951, 953 and external storage devices 925, 927 are referred to as "computer storage", and may comprise one or more of the following: random access memory ("RAM"), read only memory ("ROM"), erasable programmable read-only memory ("EEPROM"), electrically erasable programmable read-only memory ("EEPROM"), flash memory or other kinds of computer memories, compact disc read-only memory ("CD ROM"), digital versatile discs ("DVD") or other kinds of optical disc-based storage, magnetic cassettes, magnetic tape, magnetic disc storage or other kinds of magnetic storage technologies, or any other medium configured to store computer-readable instructions.

The computer 910 may further comprise an input 957, an output 959, and a transceiver 955, comprising an encoder and/or decoder, for formatting and/or encrypting/decrypting wired or wireless signals transmitted from and/or to the computer 910 over a network 960, which may be either a local area network ("LAN") or a wide area network ("WAN"). As used herein, the term "computer" may comprise one of: a personal computer, a handheld computer, a server, a router, an access controller, a wireless security device, a network node, a peer device, a fixed security device, a central security console, and the like.

As used herein, an element or function recited in the singular and preceded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A mobile security device, comprising:

a memory;

a display; and a processor coupled with each of the memory and the display, wherein the memory comprises computer-readable instructions that when executed by the processor cause a map of an area proximate the mobile security device to be shown on the display together with at least a visual representation of one or more installation sensors located within a predefined spatial extent of the mobile security device; and the mobile security device is configured to wirelessly transmit information regarding a security checkpoint, location of the checkpoint being known to a user of the mobile security device, to a remote server.

2. The mobile security device of claim 1, wherein the computer-readable instructions, when executed by the processor, further cause the map to be shown on the display together with an event detected by one or more of the visually represented installation sensors.

3. The mobile security device of claim 1, further comprising:

an optical device coupled with the processor and memory, the optical device configured to capture an image of a barcode display positioned on a fixed security device.

4. The mobile security device of claim 3, further comprising:

a transceiver coupled with the processor, wherein the processor is configured to output a signal that causes the transceiver to wirelessly transmit at least an informational element of the barcode display to the remote server.

5. The mobile security device of claim 4, wherein the informational element of the barcode display comprises at least one of:

a fixed security station identifier;

a time code; and a certification informational element.

6. The mobile security device of claim 3, wherein the barcode display comprises one or more light sources.

7. A mobile security device, comprising:

a memory;

a display; and a processor coupled with each of the memory and the display, wherein the memory comprises computer-readable instructions that when executed by the processor cause a map of an area proximate the mobile security device to be shown on the display together with at least a visual representation of an event detected by one or more installation sensors located within a predefined spatial extent of the mobile security device; and the mobile security device is configured to wirelessly transmit information regarding a security checkpoint, location of the checkpoint being known to a user of the mobile security device, to a remote server.

8. The mobile security device of claim 7, further comprising:

an optical device coupled with the processor and memory, the optical device configured to capture an image of a barcode display positioned on a fixed security device.

9. The mobile security device of claim 8, further comprising:

a transceiver coupled with the processor, wherein the processor is configured to output a signal that causes the transceiver to wirelessly transmit at least an informational element of the barcode display to the remote server.

10. The mobile security device of claim 9, wherein the informational element of the barcode display comprises at least one of:

a fixed security station identifier;

a time code; and a certification informational element.

11. The mobile security device of claim 8, wherein the barcode display comprises one or more light sources.

12. A method, comprising:

locating a mobile security device;

obtaining, from the mobile security device, information regarding security checkpoints, location of the checkpoints being known to a user of the mobile security device;

determining whether location data, most recent direction of movement data and/or most recent orientation data has been received from the mobile security device;

identifying an installation sensor proximate the location of the mobile security device;

retrieving at least sensor location data and/or sensor data for the identified installation sensor; and transmitting the retrieved sensor location data and/or the retrieved sensor data, together with orientation data, which is data configured to orient a map display of the mobile security device with respect to at least one of the mobile security device's location, most recent direction of movement and/or most recent orientation.

13. The method of claim 12, wherein if location data, most recent direction of movement data and/or most recent orientation data have not been received from a mobile security device, the method further comprises:

calculating the mobile security device's location, most recent direction of movement, and/or most recent orientation from sensor data provided at least by the identified installation sensor.

14. The method of claim 12, wherein identifying an installation sensor further comprises:

determining a spatial extent about the mobile security device.

15. The method of claim 14, wherein a size of the spatial extent varies, and is selected as being appropriate for the mobile security device's location.

16. The method of claim 14, wherein the spatial extent 302 has a radius that is configurable and adjustable by a user of the mobile security device.

17. A method comprising:

scanning with a mobile security device a barcode display positioned on a security checkpoint device, location of the security checkpoint device being known to a user of the mobile security device; and transmitting, using a transceiver of the mobile security device, at least a certification informational element to a remote server.

18. The method of claim 17, further comprising:

processing, using a processor of the mobile security device, the scanned barcode display to a smaller data set that retains the certification informational element.

19. The method of claim 17, wherein the server is a component of a central security console.

20. A method, comprising:

detecting by an installation sensor a presence of a mobile security device; and transmitting from the installation sensor at least a certification informational element to the mobile security device, regarding a security checkpoint, location of the security checkpoint being known to a user of the mobile security device.

21. A method, comprising:

detecting by a mobile security device of a presence of a security checkpoint device proximate the mobile security device, location of the security checkpoint device being known to the user of the mobile security device;

receiving at least a certification informational element from the detected security checkpoint device; and transmitting, using a transceiver of the mobile security device, at least the certification informational element to a remote server.

* * * * *